(12) United States Patent
Kim et al.

(10) Patent No.: US 11,023,062 B2
(45) Date of Patent: Jun. 1, 2021

(54) BEZEL-LESS TOUCH SCREEN APPARATUS AND METHOD FOR MANUFACTURING SAME

(71) Applicant: TOVIS CO., LTD., Incheon (KR)

(72) Inventors: Yong Beom Kim, Incheon (KR); In Su Park, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 16/606,769

(22) PCT Filed: Apr. 9, 2018

(86) PCT No.: PCT/KR2018/004141
§ 371 (c)(1),
(2) Date: Oct. 20, 2019

(87) PCT Pub. No.: WO2018/194305
PCT Pub. Date: Oct. 25, 2018

(65) Prior Publication Data
US 2020/0133423 A1    Apr. 30, 2020

(30) Foreign Application Priority Data
Apr. 20, 2017    (KR) .................. 10-2017-0051277

(51) Int. Cl.
*G06F 3/041* (2006.01)
*G06F 1/16* (2006.01)
*H01B 1/04* (2006.01)

(52) U.S. Cl.
CPC .......... *G06F 3/0412* (2013.01); *G06F 1/1601* (2013.01); *H01B 1/04* (2013.01);
(Continued)

(58) Field of Classification Search
CPC ........ G06F 3/0412; G06F 3/041; G06F 3/044; G06F 2203/04102; G06F 2203/04103
See application file for complete search history.

(56) References Cited

U.S. PATENT DOCUMENTS 8,665,230 B2 *    3/2014    Liu .................. G06F 3/0445
                                                345/173
8,854,327 B2 *   10/2014    Cok .................. G06F 3/0448
                                                345/173
(Continued)

FOREIGN PATENT DOCUMENTS

JP    2014-157400 A    8/2014
KR    10-2013-0027307 A    3/2013
(Continued)

OTHER PUBLICATIONS

English Translation JP 2014-157400 A, Makoto Abe; Published Aug. 28, 2014, ; pp. 1-27; Year 2014.*
(Continued)

*Primary Examiner* — Vijay Shankar
(74) *Attorney, Agent, or Firm* — Revolution IP, PLLC

(57) ABSTRACT

A bezel-less touch screen apparatus includes: a display panel for displaying an image; and a touch sheet superposed on the display panel, for generating an input signal by a touch by an operator, wherein the touch sheet includes: a touch area for generating a touch signal, the touch area being located on an image display area of the display panel, in which an image is displayed; and a side surface attachment part on which signal electrodes are gathered from the edge of the touch area and connected to a controller and that is bent and attached to the side surfaces of the display panel so as to not protrude over the edge of the display panel. Therefore, the bezel width can be minimized.

9 Claims, 10 Drawing Sheets

(52) U.S. Cl.
CPC .............. *G06F 2203/04102* (2013.01); *G06F 2203/04103* (2013.01)

(56) References Cited

U.S. PATENT DOCUMENTS

| | | | |
|---|---|---|---|
| 8,885,069 B2 * | 11/2014 | Kunishige | .............. H04N 5/232 348/240.1 |
| 10,234,987 B2 * | 3/2019 | Moon | .................... G06F 3/0446 |
| 2011/0267503 A1 * | 11/2011 | Kunishige | .......... H04N 5/23219 348/240.1 |
| 2013/0056243 A1 | 3/2013 | Kim et al. | |
| 2015/0122623 A1 | 5/2015 | Kim et al. | |
| 2017/0090661 A1 | 3/2017 | Kim et al. | |

FOREIGN PATENT DOCUMENTS

| | | |
|---|---|---|
| KR | 10-2015-0051393 A | 5/2015 |
| KR | 10-1658434 B1 | 9/2016 |
| KR | 10-2017-0039004 A | 4/2017 |

OTHER PUBLICATIONS

International Search Report for PCT/KR2018/004141 dated Jul. 13, 2018 from Korean Intellectual Property Office.

\* cited by examiner

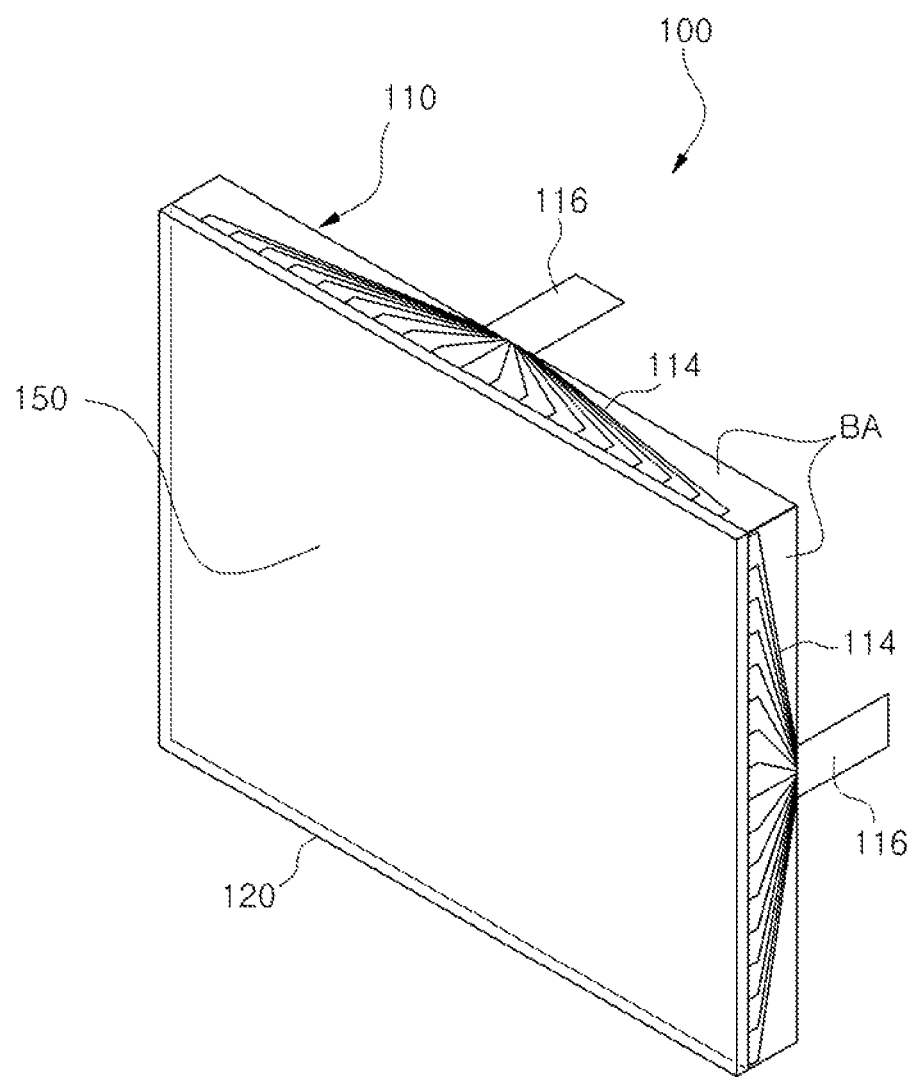
[FIG.1]

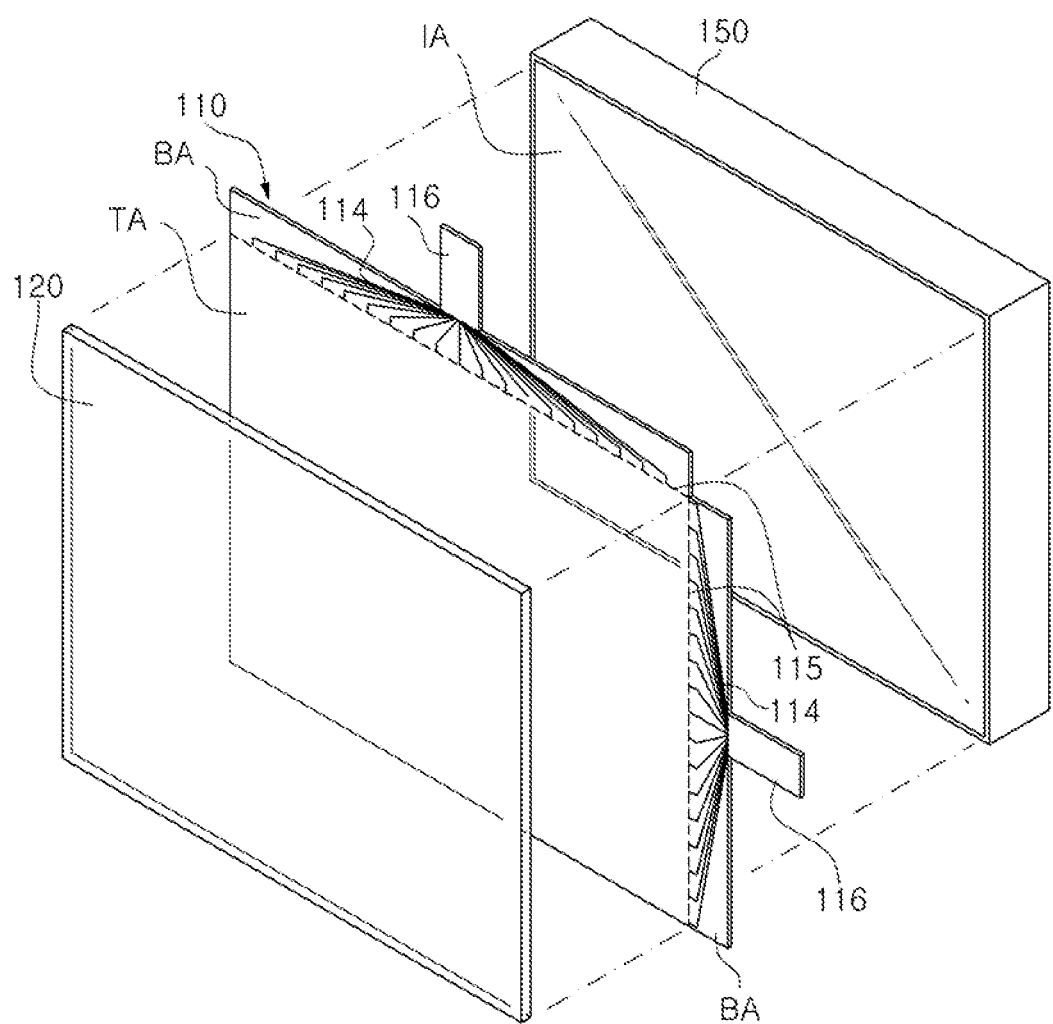
[FIG.2]

[FIG.3]
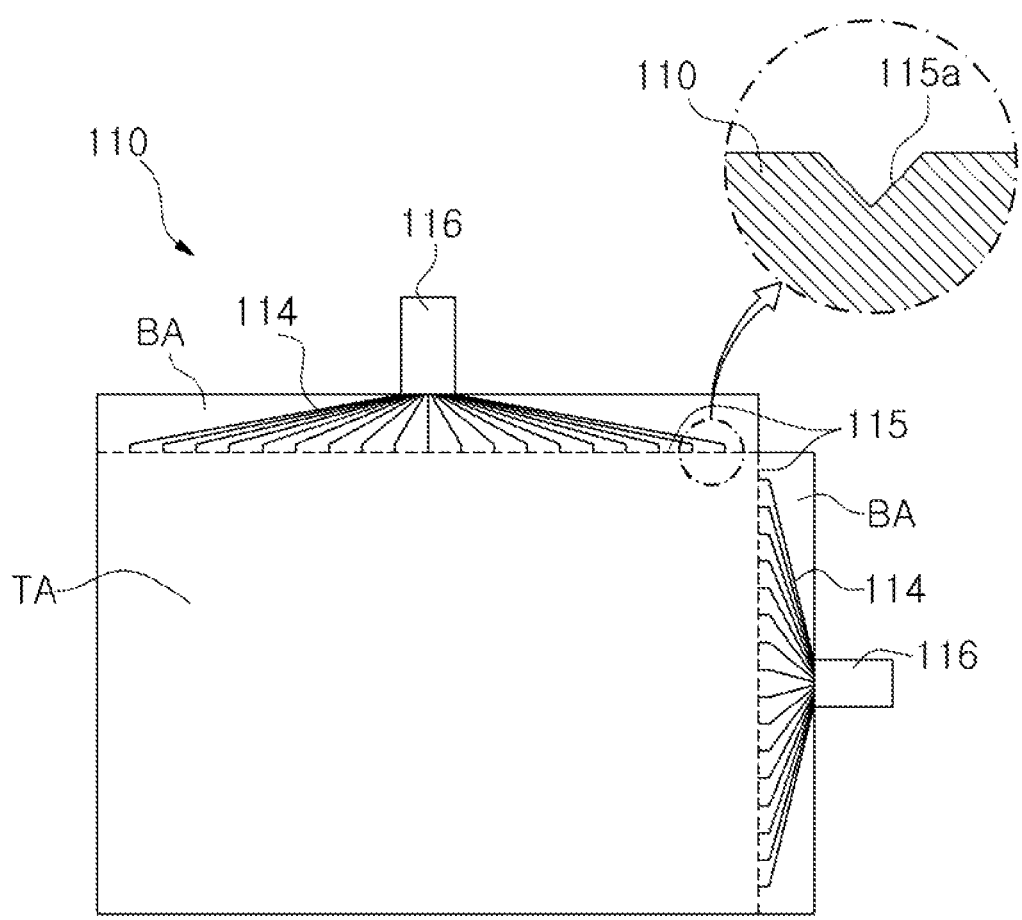

[FIG.4]
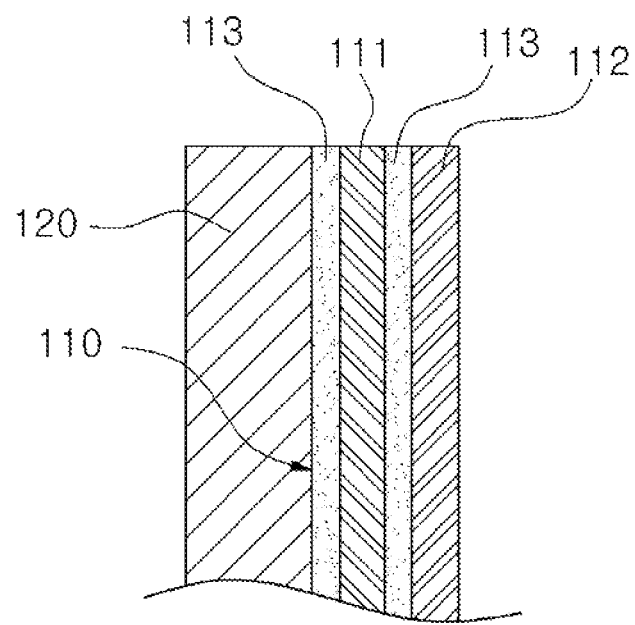

[FIG.5]
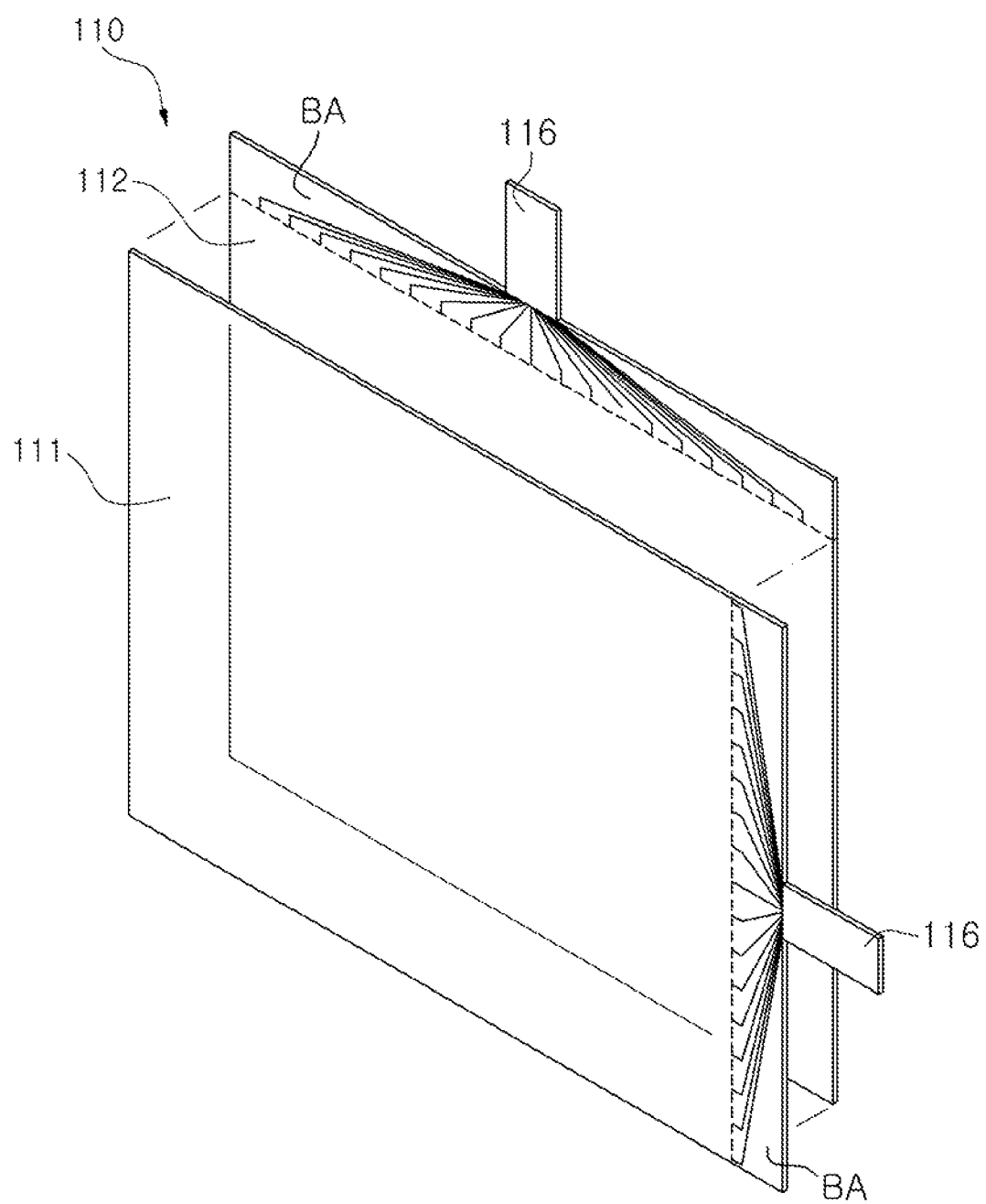

[FIG.6]
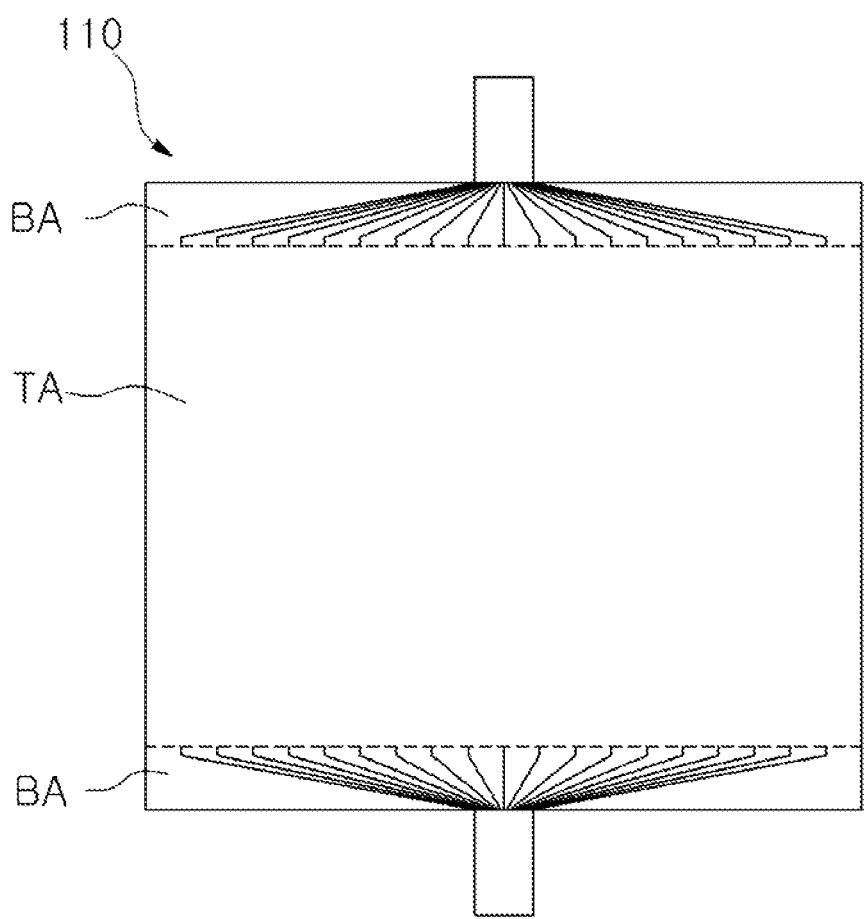

[FIG.7]
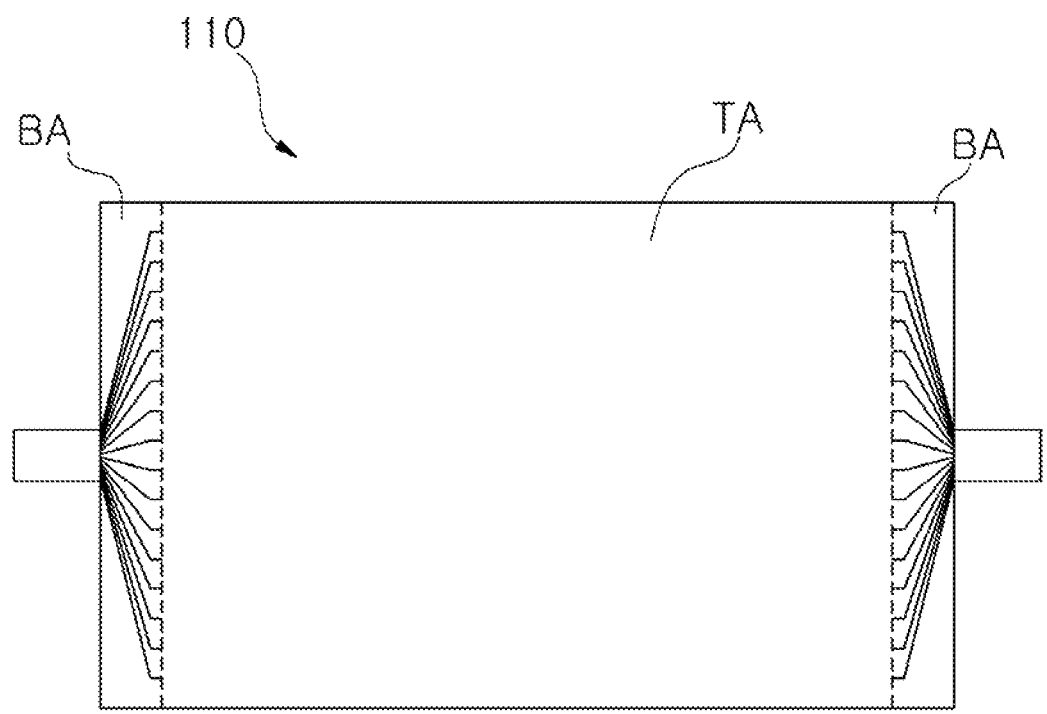

[FIG.8]
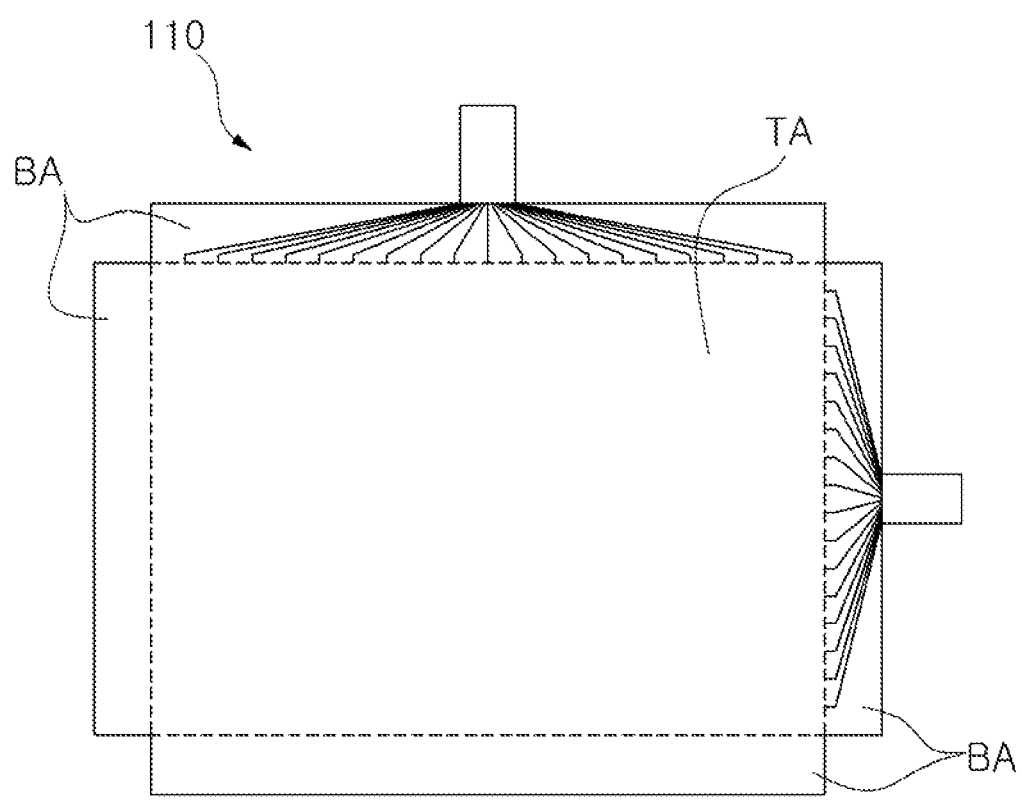

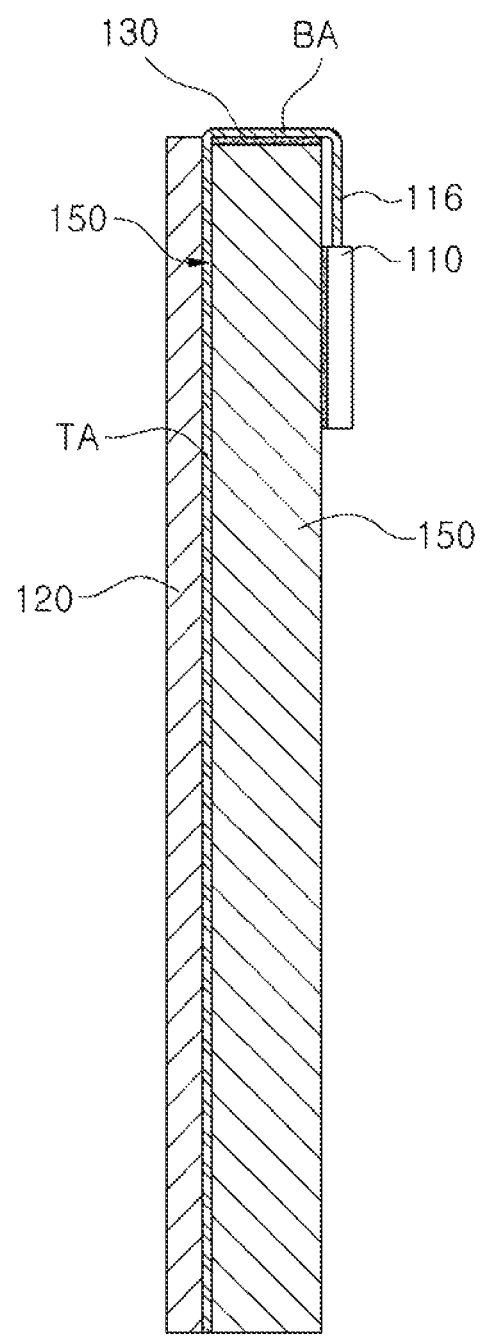
[FIG.9]

[FIG.10]
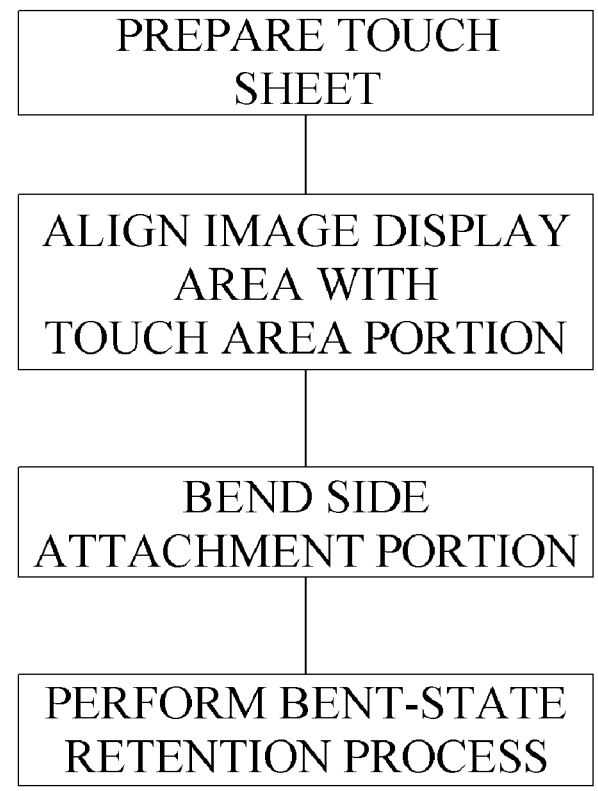

BEZEL-LESS TOUCH SCREEN APPARATUS AND METHOD FOR MANUFACTURING SAME

TECHNICAL FIELD

The present invention relates to a touchscreen apparatus that allows a touch signal to be input by touch and at the same time displays an image and a method of manufacturing the same.

BACKGROUND ART

In general, an image is displayed on a touchscreen apparatus, and at the same time an input signal is generated when the displayed image is touched.

Since such a touchscreen apparatus displays various images in order to induce touch, it is possible to simultaneously output an image and input a manipulation signal using a single touchscreen without a separate input means.

Meanwhile, the touchscreen apparatus is configured such that a display panel configured to display an image is disposed under a transparent touch panel configured to generate a touch signal in an overlapping state, and electrodes are distributed and disposed throughout the touch panel in order to generate a manipulation signal over the entire surface of the display panel.

A connection portion at which electrodes are gathered so as to be connected to a controller in order to transmit a contact signal generated as a result of contact with the touch panel to a controller is formed at the touch panel so as to extend outside a touch area configured to generate a touch signal.

At this time, the number of electrodes of the touch panel is increased in proportion to the size of the display panel, whereby the size of the connection portion is also increased. In addition, the size of the connection portion is also increased in proportion to the size of the touch panel. As a result, the size of a bezel configured to cover the edge of the touchscreen apparatus is increased.

This problem does not conform to a technical trend of reducing the size of the bezel in order to enlarge an image display area of the display panel and thus to increase a field of vision.

DISCLOSURE

Technical Problem

The present invention has been made in view of the above problems, and it is an object of the present invention to provide a bezel-less touchscreen apparatus configured such that the size of a bezel is minimized in order to enlarge an image display area of a display panel and thus to increase a field of vision and a method of manufacturing the same.

Technical Solution

In accordance with an aspect of the present invention, the above and other objects can be accomplished by the provision of a bezel-less touchscreen apparatus including a display panel configured to display an image and a touch sheet disposed so as to overlap the display panel in order to generate an input signal by manipulator touch, wherein the touch sheet includes a touch area portion located at an image display area portion of the display panel in order to generate a touch signal, the image display area portion being configured to display an image, and a side attachment portion at which signal electrodes are gathered so as to be connected to a controller, the side attachment portion being disposed at the circumference of the touch area portion, the side attachment portion being bent so as not to protrude from the edge of the display panel and attached to a side surface of the display panel.

Each of the signal electrodes may be made of one of metal mesh, silver nanowire, graphene, and carbon nanotube exhibiting bendability in order to prevent the signal electrodes from being cut when the side attachment portion is bent from the touch area portion.

The touch sheet may include a bending line configured to mark a border at which the side attachment portion is bent.

The bending line may include notches formed along the bending line in the shape of a dotted line in order to reduce unbending force of the side attachment portion in the state in which the side attachment portion is bent.

The touch sheet may include a protective panel attached to the front surface of the touch sheet in order to protect the touch sheet.

The bezel-less touchscreen apparatus may include an adhesive member configured to attach the side attachment portion to the side surface of the display panel.

A bent-state retention process of heating a portion of the touch sheet at which the side attachment portion is bent to a glass transition temperature or higher and cooling the portion of the touch sheet may be performed in order to prevent the side attachment portion from being unbent due to restoring force thereof in a bent state, thereby retaining a bent shape of the side attachment portion.

The touch sheet may include a driving electrode layer configured to generate a driving signal in response to touch and a sensing electrode layer configured to sense the driving signal, and the side attachment portion may be integrally formed with each of the driving electrode layer and the sensing electrode layer, the side attachment portion integrally formed with the driving electrode layer being formed so as to be attached to a side surface of the display panel and the side attachment portion integrally formed with the sensing electrode layer being formed so as to be attached to another side surface of the display panel.

In accordance with another aspect of the present invention, there is provided a method of manufacturing the bezel-less touchscreen apparatus, the method including a step of preparing the touch sheet so as to correspond to the size of the display panel, a step of disposing the touch area portion of the touch sheet on an effective image area of the display panel so as to correspond thereto, and a step of bending the side attachment portion protruding from the edge of the display panel in the state in which the touch area portion corresponds to the image display area portion of the display panel and attaching the side attachment portion to the side surface of the display panel.

The step of bending and attaching the side attachment portion to the side surface of the display panel may include a step of performing a bent-state retention process of preventing the side attachment portion from being unbent due to restoring force thereof in a bent state in order to prevent the side attachment portion from being unbent due to the restoring force thereof in the bent state.

Advantageous Effects

According to the present invention, the side attachment portion, at which the signal electrodes are gathered so as to be connected to the controller, is bent from the touch area portion and is then attached to the side surface of the display panel, whereby it is possible to minimize the portion of the touch panel protruding from the display panel and thus to minimize the size of the bezel.

In addition, the bending line is formed at the side attachment portion, whereby it is possible to easily bend the side attachment portion.

In addition, the bent-state retention process is performed in the state in which the side attachment portion is bent, whereby it is possible to prevent the side attachment portion from being separated from the display panel due to restoring force thereof.

DESCRIPTION OF DRAWINGS

FIG. 1 is a perspective view of a bezel-less touchscreen apparatus according to an embodiment of the present invention.

FIG. 2 is an exploded perspective view of the bezel-less touchscreen apparatus according to the embodiment of the present invention.

FIG. 3 is a front view showing a touch sheet of the bezel-less touchscreen apparatus according to the embodiment of the present invention.

FIG. 4 is a partial sectional view showing the touch sheet of the bezel-less touchscreen apparatus according to the embodiment of the present invention.

FIG. 5 is a separated perspective view showing the touch sheet of the bezel-less touchscreen apparatus according to the embodiment of the present invention.

FIG. 6 is a front view showing a modification of the touch sheet of the bezel-less touchscreen apparatus according to the embodiment of the present invention.

FIG. 7 is a front view showing another modification of the touch sheet of the bezel-less touchscreen apparatus according to the embodiment of the present invention.

FIG. 8 is a front view showing a further modification of the touch sheet of the bezel-less touchscreen apparatus according to the embodiment of the present invention.

FIG. 9 is a side sectional view of the bezel-less touchscreen apparatus according to the embodiment of the present invention.

FIG. 10 is a flowchart showing a method of manufacturing the bezel-less touchscreen apparatus according to the embodiment of the present invention.

DESCRIPTION OF REFERENCE SYMBOLS

100: Bezel-less touchscreen apparatus
110: Touch sheet
111: Driving electrode layer
112: Sensing electrode layer
113: Optical adhesive layer
114: Signal electrodes
115: Bending lines
115*a*: Notches
116: Circuit boards
120: Protective panel
150: Display panel
BA: Side attachment portions
TA: Touch area portion
IA: Image display area portion

BEST MODE

Hereinafter, embodiments of the present invention will be described with reference to the accompanying drawings.

First, a bezel-less touchscreen apparatus 100 according to the present invention may be applied to and used in various display industry fields, such as a game console having a relatively large screen, an electric board, digital signage, a kiosk, and a public information display.

As shown in FIGS. 1, 2, and 9, a bezel-less touchscreen apparatus 100 according to an embodiment of the present invention may include a display panel 150.

The display panel 150 may receive an image signal from an image source apparatus, such as a computer, in order to display an image.

Meanwhile, the display panel 150 may be an OLED, an LCD, or a PDP.

Here, the display panel 150 may include a panel case configured to accommodate the display panel 150, and, in the case of the LCD, may further include a backlight unit installed in the panel case in order to provide a light source.

As shown in FIGS. 1 to 9, the bezel-less touchscreen apparatus 100 according to the embodiment of the present invention may include a touch sheet 110.

The touch sheet 110 may generate a touch signal by manipulator touch.

Meanwhile, the touch sheet 110 may be formed so as to be transparent such that an image displayed on the display panel 150 is transmitted through the display panel so as to be seen when overlapping the display panel 150, and may be made of a flexible material that is capable of being flexibly bent.

In addition, the touch sheet 110 may be a resistive touch sheet that generates a touch signal based on pressure applied thereto or a capacitive touch sheet that generates a touch signal based on static electricity. In this embodiment, the touch sheet 110 is described as being a capacitive touch sheet.

Meanwhile, the touch sheet 110 may include signal electrodes 114.

The signal electrodes 114, in which driving electrodes Tx and sensing electrodes Rx are arranged so as to form a pattern, may generate a touch signal based on capacitance that is changed by static electricity on a touched portion thereof.

Meanwhile, the touch sheet 110 may be configured to have a structure in which a driving electrode layer 111, in which the driving electrodes are arranged, and a sensing electrode layer 112, in which the sensing electrodes are arranged, are attached to each other via an optical adhesive layer (OCA) 113.

At this time, the optical adhesive layer 113 also functions to electrically partition the driving electrode layer 111 and the sensing electrode layer 112 so as not to contact each other.

In addition, the touch sheet 110 may include a touch area portion TA and side attachment portions BA.

Each of the touch area portions TA is a portion that generates a touch signal, and may be formed so as to have a size and a shape corresponding to those of an image display area portion IA, on which an image is displayed, of the display panel 150.

Each of the touch area portions TA may be a portion to which a circuit board (FPCB) 116, at which the signal electrodes 114 are gathered and which is configured to provide a touch signal that is generated to a controller, is connected, and the side attachment portions BA may be all portions protruding from the edge of the display panel in the state in which the touch sheet 110 overlaps the display panel 150.

As shown in FIG. 5, the side attachment portions BA may be formed at the driving electrode layer 111 and the sensing electrode layer 112, which overlap each other, and the side attachment portion BA formed at the driving electrode layer 111 and the side attachment portion BA formed at the sensing electrode layer 112 may be formed so as to be attached to different side surfaces of the display panel 150, and may be formed so as to have different shapes and sizes.

At this time, for easy manufacture and easy bending, the side attachment portion BA formed at the driving electrode layer 111 may be formed integrally with the driving electrode layer 111, and the side attachment portion BA formed at the sensing electrode layer 112 may be formed integrally with the sensing electrode layer 112.

In addition, each of the side attachment portions BA may not be formed at more than one of the upper, lower, left, and right sides of the touch sheet 110 in the state in which the touch area portion TA of the touch sheet 110 and the image display area portion IA of the display panel 150 are aligned with each other, and the other sides of the touch sheet may be formed so as to be aligned with the edge of the display panel 150, whereby time necessary to bend the side attachment portions BA may be reduced at the time of manufacturing the bezel-less touchscreen apparatus 100.

For example, as shown in FIG. 3, the side attachment portions BA may be formed at the upper and right sides of the touch sheet 110, and the left and lower sides of the touch sheet may be formed so as to be aligned with the display panel 150, as shown in FIG. 6, the side attachment portions BA may be formed at the upper and lower sides of the touch sheet 110, and the left and right sides of the touch sheet may be formed so as to be aligned with the display panel 150, as shown in FIG. 7, the side attachment portions BA may be formed at the left and right sides of the touch sheet 110, and the upper and lower sides of the touch sheet may be formed so as to be aligned with the display panel 150, or as shown in FIG. 8, the side attachment portions BA may be formed at all of the upper, lower, left, and right sides of the touch sheet 110.

In addition, bending lines 115 configured to partition the touch area portion TA and the side attachment portions BA from each other in order to bend the side attachment portions BA from the touch area portion TA may be marked on the touch sheet 110, and the side attachment portions BA may be bent from the edge of the display panel 150 so as to be attached to the side surfaces of the display panel 150.

Here, the touch sheet 110 is manufactured so as to have a size corresponding to the size of the display panel 150. The larger the size of the display panel 150, the larger the size of the touch sheet 110 in proportion thereto, and the larger the size of the touch sheet 110, the larger the number of touch generation points and thus the larger the number of driving electrodes and sensing electrodes.

As a result, the larger the size of the display panel, the larger the size of the portion at which the signal electrodes are gathered so as to be connected to the controller. In the present invention, therefore, the side attachment portions BA protruding from the display panel 150 may be bent and attached to the side surfaces of the display panel 150 so as to correspond to the size of the display panel 150, whereby it is possible to minimize the size of bezel.

Meanwhile, the bending lines 115 formed on the touch sheet 110 in order to bend the side attachment portions BA may be printed using a paint. In the case in which the side attachment portions BA are forcibly bent from the touch sheet 110, however, the bent portions may be separated due to restoring force of the touch sheet 110.

In order to prevent this, the bending lines 115 may be formed as notches 115a arranged in a dotted line, whereby it is possible to minimize generation of restoring force at the time of bending the side attachment portions BA.

At this time, the notches 115a may be formed between the respective signal electrodes 114 in order to protect the signal electrodes 114.

Meanwhile, each of the signal electrodes 114, which include the driving electrodes and the sensing electrodes, of the touch sheet 110 may be made of a material exhibiting bendability in order to prevent the signal electrodes 114 from being cut when the side attachment portions BA are bent.

For example, each of the signal electrodes 114 may be made of one of metal mesh, silver nanowire (Ag-nanowire), graphene, and carbon nanotube that can be easily bent. In addition, each of the signal electrodes 114 may be made of a transparent conductive material exhibiting flexibility.

Here, in the case in which each of the signal electrodes 114 is made of indium tin oxide (ITO), the signal electrodes may be cut when the side attachment portions BA are bent, since ITO exhibits low bendability.

Meanwhile, in the case in which the side attachment portions BA protrude by a length greater than the thickness of the side surfaces of the display panel 150 in the state of being bent so as to be located at the side surfaces of the display panel 150, end portions of the side attachment portions BA may be bent once again toward the rear surface of the display panel 150 in the state in which the side attachment portions are bent so as to face the side surfaces of the display panel 150.

At this time, the controller, which is connected to the side attachment portions BA of the touch sheet 110, may be disposed at the rear surface of the display panel 150 so as to be connected to the side attachment portions at the rear surface of the display panel 150.

Meanwhile, a bent-state retention process may be formed in order to reduce restoring force of the touch sheet 110 in the state in which the side attachment portions BA are attached such that the bent shape of the side attachment portions is retained.

In an example of the bent-state retention process, heat having temperature higher than the glass transition temperature of the touch sheet 110 may be applied to the touch sheet 110 in the state in which the side attachment portions BA are bent so as to be attached to the side surfaces of the display panel 150 in order to fluidize the touch sheet 110, and then immediately the touch sheet may be cooled, whereby the bent state of the side attachment portions BA may be retained.

At this time, the touch sheet 110 may be heated using a hot air blower configured to blow hot air, and the touch sheet 110 may be cooled using a cool air blower configured to blow cool air.

In another example of the bent-state retention process, a bent-state retention material may be applied to the bent portions of the touch sheet 110 in the state in which the side attachment portions BA are bent, and then the bent-state retention material may be hardened, or adhesive films formed in advance in a bent shape may be attached to the surfaces of the side attachment portions BA that contact the side surfaces of the display panel 150 or the outer surfaces of the side attachment portions in order to retain the bent state of the side attachment portions BA.

Here, the bent-state retention material may be realized by a naturally curable resin, a thermosetting resin, or an ultraviolet-curable resin, and the bent-state retention material may be applied to the surfaces of the side attachment portions BA that contact the side surfaces of the display panel 150 or the outer surfaces of the side attachment portions so as to be cured in a bent state.

At this time, in the case in which the bent-state retention material is applied to the surfaces of the side attachment portions BA that contact the side surfaces of the display panel 150, the bent-state retention material may perform the function of an adhesive member 130, a description of which will follow, in order to attach the side attachment portions BA to the side surfaces of the display panel 150.

As shown in FIG. 9, the bezel-less touchscreen apparatus 100 according to the embodiment of the present invention may include an adhesive member 130.

The adhesive member 130 may attach the side attachment portions BA to the side surfaces of the display panel 150 in the state in which the side attachment portions BA are bent.

Meanwhile, the adhesive member 130 may be realized by an adhesive or an adhesive film exhibiting adhesiveness.

Here, the adhesive member 130 may include fixing pins configured to fix the side attachment portions BA to the display panel 150 in the state of being bent so as to be located at the side surfaces of the display panel 150 or other elements located therearound.

As shown in FIGS. 1, 2, and 9, the bezel-less touchscreen apparatus 100 according to the embodiment of the present invention may include a protective panel 120.

The touch sheet 110 may be attached to the rear surface of the protective panel 120 such that the touch sheet 110 is protected and at the same time the display panel 150, which is located at the lower side of the touch sheet 110 is also protected.

Meanwhile, the protective panel 120 may be made of transparent glass or a transparent synthetic resin, and the protective panel 120 may be formed so as to have the same size as the circumference of the display panel 150.

In addition, the optical adhesive layer 113, via which the driving electrode layer 111 and the sensing electrode layer 112 are attached to each other, may be further installed at the touch sheet 110 such that the touch sheet 110 is attached to the protective panel 120 via the optical adhesive layer 113.

The operation and effects of the respective components described above will be described with a method of manufacturing the bezel-less touchscreen apparatus 100 according to the embodiment of the present invention.

As shown in FIG. 10, in the method of manufacturing the bezel-less touchscreen apparatus 100 according to the embodiment of the present invention, first, a touch sheet 110 is prepared so as to correspond to the size of a display panel 150.

At this time, the touch sheet 110 is manufactured such that a touch area portion TA configured to generate a touch signal has the same size as an image display area portion IA of the display panel 150, and side attachment portions BA configured to connect signal electrodes 114 to a controller are formed at the edge of the touch area portion TA.

Meanwhile, each of the signal electrodes 114 of the touch sheet 110 is made of a material exhibiting bendability, whereby the signal electrodes 114 may be prevented from being cut when the side attachment portions BA are bent from the touch area portion TA.

The touch sheet 110 may be configured such that a driving electrode layer 111, in which driving electrodes are formed, and a sensing electrode layer 112, in which sensing electrodes, configured to generate a touch signal through interaction with the driving electrodes, are formed, are adhered to each other via an OCA sheet, and the side attachment portions BA, at which the driving electrodes and the sensing electrodes are gathered so as to be connected to the controller, may be formed at the driving electrode layer 111 and the sensing electrode layer 112.

In addition, an optical adhesive layer 113 configured to attach the touch sheet 110 to a protective panel 120 may be further attached to the front surface of the touch sheet 110, and a circuit board (FPCB) 116, configured to sense coordinates of a touch signal generated by the signal electrodes 114, may be installed at each of the side attachment portions BA.

Bending lines 115 configured to partition the touch area portion TA and the side attachment portions BA from each other in order to bend the side attachment portions may be printed on the touch sheet 110 using a paint, or may be formed in the touch sheet as notches 115*a* using a laser.

Here, in the case in which the bending lines 115 are formed as notches 115*a*, restoration of the side attachment portions BA may be reduced when the side attachment portions are bent from the touch area portion TA, whereby it is possible to prevent the side attachment portions BA from being separated from the side surfaces of the display panel 150.

In addition, a transparent protective panel 120 configured to protect the touch sheet 110 may be attached to the front surface of the touch sheet 110, and the protective panel 120 may be formed so as to have the same size as the circumference of the display panel 150.

When the touch sheet 110 is prepared, as described above, the touch area portion TA of the touch sheet 110, to which the protective panel 120 is attached, and the image display area portion IA of the display panel 150 are placed on the front surface of the display panel 150 so as to be aligned with each other.

The side attachment portions BA located so as to protrude from the edge of the display panel 150 are bent along the bending lines 115 so as to be located at the side surfaces of the display panel 150, and are attached to the side surfaces of the display panel 150.

At this time, an adhesive member 130 may be attached in advance to the side surfaces of the display panel 150 to which the side attachment portions BA are attached, or to corresponding surfaces of the side attachment portions BA, whereby the side attachment portions BA may be attached to the side surfaces of the display panel 150 when bent.

Meanwhile, when the side attachment portions BA are bent and attached to the side surfaces of the display panel 150, a bent-state retention process is performed in order to reduce restoring force of the side attachment portions BA, by which the side attachment portions are unbent to the original states thereof.

Here, in the bent-state retention process, the portions of the touch sheet 110 at which the side attachment portions BA are bent may be heated to a glass transition temperature or higher at which the touch sheet 110 can be fluidized, and may then be cooled immediately in the heated state thereof in order to retain the bent state of the side attachment portions BA.

In another example of the bent-state retention process, a bent-state retention material exhibiting curability may be applied to the bent portions of the touch sheet, and then the bent-state retention material may be hardened in order to reduce restoring force of the side attachment portions BA, or a bent-state retention material formed in advance in a bent shape so as to correspond to the bent state of the side attachment portions BA may be attached to the bent portions of the touch sheet using the adhesive member 130 in order to forcibly constrain the side attachment portions BA and thus to retain the bent state of the side attachment portions BA.

In the bezel-less touchscreen apparatus 100 according to the embodiment of the present invention and the bezel-less touchscreen apparatus 100 manufactured using the method of manufacturing the same, therefore, the side attachment portions BA, at which the signal electrodes 114 of the touch sheet 110 are gathered so as to be connected to the controller, may be bent so as to be located at the side surfaces of the display panel 150 and may then be attached to the side surfaces of the display panel without protruding from the display panel, whereby the bezel of the display panel 150 may be minimized, and ultimately it is possible to provide a bezel-less touchscreen apparatus 100.

In addition, the bending lines may be formed as notches 115a in order to reduce restoring force of the side attachment portions BA in the state of being bent, or the bent-state retention process may be performed in order to prevent the bent side attachment portions BA from being separated from the display panel 150 due to restoring force thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A bezel-less touchscreen apparatus comprising a display panel configured to display an image and a touch sheet disposed so as to overlap the display panel in order to generate an input signal by manipulator touch, wherein the touch sheet comprises:
   a touch area portion located at an image display area portion of the display panel in order to generate a touch signal, the image display area portion being configured to display an image; and
   a side attachment portion at which signal electrodes are gathered so as to be connected to a controller, the side attachment portion being disposed at a circumference of the touch area portion, the side attachment portion being bent so as not to protrude from an edge of the display panel and attached to a side surface of the display panel,
   wherein a bent-state retention process of heating a portion of the touch sheet at which the side attachment portion is bent to a glass transition temperature or higher and cooling the portion of the touch sheet is performed in order to prevent the side attachment portion from being unbent due to restoring force thereof in a bent state, thereby retaining a bent shape of the side attachment portion.

2. The bezel-less touchscreen apparatus according to claim 1, wherein each of the signal electrodes is made of one of metal mesh, silver nanowire, graphene, and carbon nanotube exhibiting bendability in order to prevent the signal electrodes from being cut when the side attachment portion is bent from the touch area portion.

3. The bezel-less touchscreen apparatus according to claim 1, wherein the touch sheet comprises a bending line configured to mark a border at which the side attachment portion is bent.

4. The bezel-less touchscreen apparatus according to claim 3, wherein the bending line comprises notches formed along the bending line in a shape of a dotted line in order to reduce unbending force of the side attachment portion in a state in which the side attachment portion is bent.

5. The bezel-less touchscreen apparatus according to claim 1, wherein the touch sheet comprises a protective panel attached to a front surface of the touch sheet in order to protect the touch sheet.

6. The bezel-less touchscreen apparatus according to claim 1, comprising an adhesive member configured to attach the side attachment portion to the side surface of the display panel.

7. A method of manufacturing the bezel-less touchscreen apparatus according to claim 1, the method comprising:
   preparing the touch sheet so as to correspond to a size of the display panel;
   disposing the touch area portion of the touch sheet on an effective image area of the display panel so as to correspond thereto; and
   bending the side attachment portion protruding from the edge of the display panel in a state in which the touch area portion corresponds to the image display area portion of the display panel and attaching the side attachment portion to the side surface of the display panel.

8. The method according to claim 7, wherein the step of bending and attaching the side attachment portion to the side surface of the display panel comprises performing a bent-state retention process of preventing the side attachment portion from being unbent due to restoring force thereof in a bent state in order to prevent the side attachment portion from being unbent due to the restoring force thereof in the bent state.

9. A bezel-less touchscreen apparatus comprising a display panel configured to display an image and a touch sheet disposed so as to overlap the display panel in order to generate an input signal by manipulator touch, wherein the touch sheet comprises:
   a touch area portion located at an image display area portion of the display panel in order to generate a touch signal, the image display area portion being configured to display an image; and
   a side attachment portion at which signal electrodes are gathered so as to be connected to a controller, the side attachment portion being disposed at a circumference of the touch area portion, the side attachment portion being bent so as not to protrude from an edge of the display panel and attached to a side surface of the display panel,
   wherein
   the touch sheet comprises a driving electrode layer configured to generate a driving signal in response to touch and a sensing electrode layer configured to sense the driving signal, and
   the side attachment portion is integrally formed with each of the driving electrode layer and the sensing electrode layer, the side attachment portion integrally formed with the driving electrode layer being formed so as to be attached to a side surface of the display panel and the side attachment portion integrally formed with the sensing electrode layer being formed so as to be attached to another side surface of the display panel.

* * * * *